Figure 1:
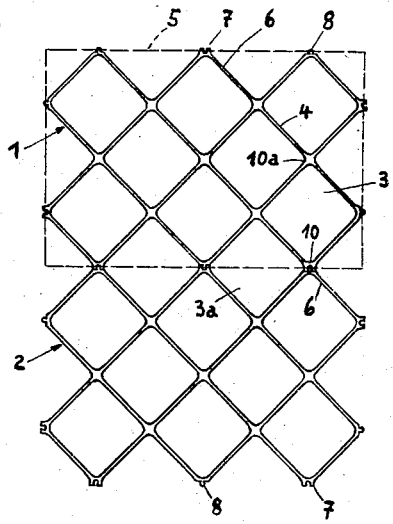

Aug. 18, 1959  F. ZWICK  2,900,495
LOUVER CONSTRUCTION FOR LIGHTING FIXTURES
Filed April 30, 1957

Inventor:
FRANZ ZWICK
BY
ATTORNEY

2,900,495
LOUVER CONSTRUCTION FOR LIGHTING FIXTURES

Franz Zwick, Ulm (Danube), Germany

Application April 30, 1957, Serial No. 655,976

1 Claim. (Cl. 240—78)

The present invention relates to louver structures for lighting fixtures, especially though not limitatively, for use in connection with fluorescent lighting strips or the like and comprising a plurality of juxtaposed light chambers or cells forming box-like openings, to screen and diffuse the light emitted from an extended light source.

The invention is more particularly concerned with louver structures of this character composed of a number of constructional units or sections which may be assembled in varying numbers and interconnected to form a composite louver structure of desired size or dimension, to suit a given lighting source or fixture. The individual units or sections are of rectangular shape, each comprising a predetermined number of cells or chambers formed by two sets of parallel walls intersecting one another at an angle, such as a right angle. Said walls, in turn, include an angle with the sides or boundary lines of the rectangle forming a section, whereby to provide a series of equi-distant projecting corners along each side of said rectangle.

Adjacent sections of a composite louver are interconnected at the adjoining corners by coupling means comprising male and female coupling elements in the form of cylindrical claw members upon one section engaging or grasping a pin or cylindrical extension of the adjacent section. In this manner, a louver structure of desired dimension comprising a number of units or sections may be assembled quickly and expeditiously, without the use of special tools or separate fastening means, to suit any existing conditions and requirements. The interengaging coupling elements at the adjoining corners of the sections provide a series of enlarged or reinforced connecting parts, hereafter referred to as coupling knots for the purpose of this specification.

In known louver constructions of this type, the coupling knots are in the form of outwardly curved cylindrical portions with the claw members upon one section having a cross-section bounded by concentric inner and outer circles, that is, with the thickness of the shanks of the jaws being uniform over the length thereof. This construction results in only a limited strength of the knots or coupling joints in relation to their size, whereby the assembled louver may be subject to sagging under its own weight, as well as to other drawbacks and defects. For this reason, it has been necessary in the past to provide additional securing means, such as by gluing or otherwise connecting the coupling parts of the sections.

An important object of the present invention is, therefore, the provision of an improved multi-section louver structure comprising a multiplicity of constructional units or sections interconnected with each other through coupling means designed to provide increased mechanical strength and flexibility, substantially devoid of the drawbacks and defects or prior coupling assemblies.

Another object of the invention is the provision of an improved coupling assembly for interconnecting the sections of a multi-unit louver, whereby the dimensions of the coupling knots or connecting parts may be reduced to a minimum.

Yet another object of the invention is the provision of a coupling assembly of this type for multi-section louver structures which, while insuring adequate strength or rigidity of the assemblies or composite structures, exhibits sufficient inherent flexibility, to allow of variations or tolerances of the constructional parts or elements as encountered in normal manufacturing and fabrication processes.

Still another object of the invention is the provision of a multi-section louver structure which can be assembled without special tools and fastening devices, substantially without impairing the mechanical strength and flexibility of the assembled structure.

Figure 2:
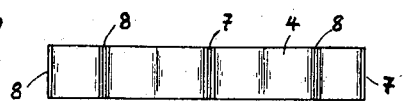
Figure 3:
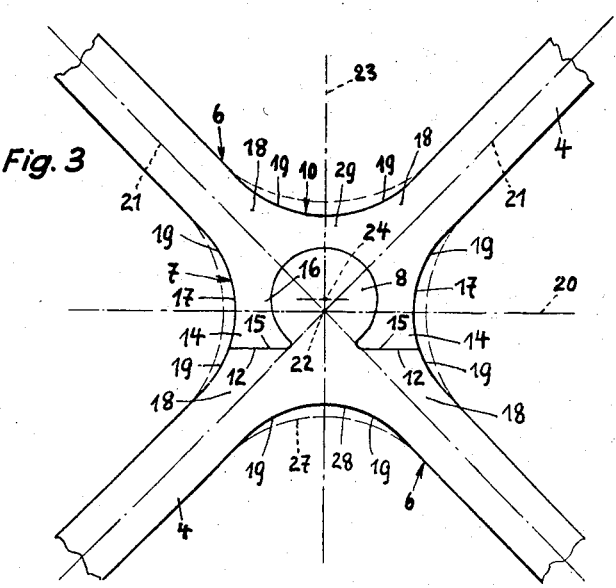

The invention, both as to its ancillary objects and novel aspects, will be better understood from the following detailed description taken in reference to the accompanying drawing, forming part of this specification and wherein:

Figs. 1 and 2 are plan and side views, respectively, of a multi-section louver assembly comprising a pair of constructional units or sections interconnected according to the invention; and Fig. 3 shows, on an enlarged scale, the improved construction of the intercoupling elements of the adjacent louver sections embodying the principles of the invention.

Like reference numerals denote like parts in the different views of the drawing.

With the foregoing objects in view, the invention involves generally the provision of an improved coupling arrangement for the interconnection of the sections of a multi-section louver assembly of the character described, wherein the shanks of the coupling claws have a lesser thickness in the center than at the outer ends by an inwardly curved or concave shape of the outer faces of the shanks. For this purpose, the ends of the meeting walls of the light cells or chambers at an intersection or coupling point are formed with enlarged or thickened portions which, in turn, are shaped concavely on both sides of their medial or center line, in such a manner as to cause the contours of said walls to gradually merge into the concavely shaped contours of said shanks.

According to an improved feature of the invention, the coupling pin upon one section grasped or embraced by the cylindrical claw upon the adjacent section, to form a coupling knot or connection, is arranged excentrically with the center of the knot or intersection of the medial lines of the cell walls, said pin being displaced in the direction towards the section provided with the claw member of the coupling.

By this construction, the composite louver composed of a multiplicity of interconnected louver sections forms a rigid self-supporting structure having a mechanical strength such as to substantially eliminate the danger of sagging if the louver is supported at its ends by a lighting fixture or the like. This increase in strength is such that additional securing means of the sections, such as by gluing or the like, may be dispensed with, whereby to greatly facilitate the assembly operations and resulting in other advantages, as will be obvious. Moreover, the greater mechanical strength of the coupling joint allows of a reduction of the size of the coupling knots, as well as of the permanent knots or connecting portions inside the individual units or sections. This reduction in the size of the parts, in turn, results in a reduction of material and improved visual appearance, not to mention the increased light flux or improved luminous efficiency of the louver.

Referring more particularly to Fig. 1 of the drawing, the composite cellular louver structure shown comprises a number of constructional units or sections, two of which being shown in the drawing at 1 and 2 and having a rectangular shape or outline, as indicated by the dot-dash lines 5 in the drawing. The sections 1 and 2 may be pre-fabricated in any suitable manner and, in a preferred construction, consist of a single unit of a suitable plastic molded by a compression or injection molding process, in a manner well known to and understood by those skilled in the art. Each section consists of two sets of parallel walls 4 intersecting one another at an angle, such as a right angle as shown in the drawing, to provide a multiplicity of juxtaposed rectangular cells or light chambers 3. Furthermore, the walls 4 form an angle with the boundary lines 5 of the sections, whereby to provide equi-spaced projecting corners 6 along said boundary lines. The sections are assembled with the corners 6 of one section adjoining the corners of the adjacent section and interconnected with the latter by the improved coupling arrangement to be described hereafter. Upon assembling of the sections, which may have any desired number to produce a composite louver of required size or dimensions, additional cells or chambers are formed at the boundaries, as shown at 3a in the drawing.

As is understood, the assembled composite louver may be mounted close and parallel to an extended light source such as a number of fluorescent strip lights (not shown), in a manner well known to and understood by those skilled in the art.

In order to couple or interconnect the sections 1 and 2, in accordance with the invention, the corners 6 are provided with male and female coupling members, Fig. 3, consisting, respectively, of cylindrical claw members 7 and cooperating coupling pins 8, both extending along the full width or depth of the sections. The pins 8 are of cylindrical shape and the claw members are provided with corresponding cylindrical recesses, whereby to engage and tightly grasp said pins to effect a coupling joint between the sections. For this purpose, the diameter of the pins 8 is advantageously slightly in excess of the diameter of the recesses or openings of the claw members 7.

In a construction of this type, the cooperating coupling elements form reinforced portions or knots 10 at the adjoining points or corners of the sections 1 and 2. The permanent connections or knots 10a within each of the sections 1 and 2 are preferably of the same size and shape as the coupling knots 10, in the interest of uniform appearance and maximum luminous efficiency of the louver.

The corners 6 of the sections formed with a coupling pin 8 are further provided with flats 12 on both sides of said pin and, similarly, the ends of the shanks 14 of the cooperating claws 7 of the adjacent section are flattened as at 15. Upon connection of the sections, the flats 12 and 15 engage one another to result in a firm and efficient coupling joint.

Due to the concavely curved shape of the outer faces 17 of the claws 7, the shanks 14 are of reduced thickness in the center, whereby to provide an increased flexibility and to insure intimate engagement with the pins 8 embraced or grasped by the claws in the assembled or coupling position. As a result, the coupling parts may be fabricated with normal standards and methods, without conforming to extremely exacting tolerances. This fact is of special importance in the molding of the louver sections from plastic materials, whereby extremely uniform dimensions are impossible to achieve by the use of practical and economical molding methods and techniques. On account of the greater flexibility of the shanks 14 constructed in accordance with the invention, slight discrepancies in the dimension of the parts are thus substantially compensated or equalized, while facilitating at the same time the assembly of the sections and insuring a stronger and more efficient coupling, in the manner pointed out and understood from the foregoing. This, in turn, results in increased all-over strength of the assembled louver structure which may be composed of a large number of component sections without the danger of sagging and being devoid of other drawbacks and defects inherent in the prior art structures.

The increased mechanical strength of the coupling joints enables a reduction of the size of the connecting parts or knots 10, resulting in the saving of material and improved appearance of the assembled louver structure. Moreover, the reduced size or cross-section of the knots 10 results in an increased light flux or greater luminous efficiency of the louver as a light screen or diffusing means.

A further increase of the strength of the assembled louver structure is achieved by enlarging the cross-section of or reinforcing the ends 18 of the walls 4 terminating in the knot 10 and by concavely shaping or causing the enlarged portions to flare outwardly with respect to the medial or center lines 21 of the walls, as shown at 19, in a manner similar to the portions 17 of the shanks of the claw members 7. Furthermore, the curved reinforced portions 18 on one side of the walls 4 are such as to gradually merge into the curves 17 of the shanks 14, in the manner shown in the drawing, to prevent any discontinuity of the total curved portions 19—17—19, both opposed curved portions 19—17—19, as well as the opposed portions 19—19 at right angle thereto forming outer contours of the knots 10 of identical shape or curvature and symmetrical with respect to both center lines 20 and 23 as well as the medial lines 21 of the walls 4. The permanent knots or connections 10a within the sections are shaped with identical contours as the coupling knots 10, in the interest of conformity and optimum luminous efficiency, as pointed out hereinabove and shown in Fig. 1.

On account of the curved contours, of the walls 4 as described, and in the absence of any abrupt transition points or discontinuities of the merging wall portions, a further increase of the strength of the knots 10 is achieved. This will allow of a further reduction of the size of the knots, resulting in additional saving of material, despite the reinforcement of the ends of the walls 4. Any additional securing of the sections by gluing or the like is thus entirely dispensed with by a structure according to the invention.

According to an improved feature of the invention, the center 24 of the coupling pin 8 is displaced relative to the center or symmetry point 22 of the knot, that is, pin 8 is located excentrically in respect to the center 22, being displaced in the direction of the claw 7 of the assembled sections. In the example shown in the drawing, the displacement between the centers 22 and 24 is about one fourth the radius of the pin.

By this excentric position of the pin 8 relative to the center or symmetry point 22 of the knot, the pin is no longer located at the portion of maximum constriction of the shanks 14 of the claw member 7, that is, the pin 8 is now positioned within the wider portion of the knot. Furthermore, by the excentric position of the pin 8 in the knot 10, the section of the part connecting or bridging the shanks 14 of the claw member 7 is reduced accordingly and to an extent being less at its most constricted portion than the minimum thickness of the shanks 14 at their most constricted position 16.

By the afore-described construction, the flexibility of the claw member 7 is further increased, whereby to insure a close and intimate engagement with the pins 8. Besides, the excentric position of the pin allows of a still further reduction of the size or dimension of the knot 10. The curved dashed lines 27 in Fig. 3 indicate the dimension or contour required if the center 24 of the pins coincided with the center 22 of the knot. Thus illustrating the resultant saving of space and material, despite the increased all-over strength and flexibility of the coupling joint. The same applies to the permanent knots 10a whose shape and size is advantageously identical to those of the coupling knots 10, as pointed out above.

While only two louver sections 1 and 2 have been shown for the sake of illustration with the male and female coupling elements alternating from one to the next corner 6 along the boundaries or contours of the sections, other arrangements or a different number of sections may be employed, to produce a final composite louver structure of desired area or dimension, to suit any lighting fixture design or extended light source.

In the foregoing, the invention has been described with reference to a specific illustrative device. It will be evident, however, that modifications as well as the substitution of equivalent elements or parts for those shown herein may be made within the broader scope of the invention as set forth in the appended claim.

I claim:

In a louver of the type described comprising a plurality of interconnectible louver sections, each of said sections consisting of two sets of parallel walls intersecting one another at an angle, to provide a multiplicity of light chambers, and each section being of rectangular shape with said walls terminating in equally spaced corners along the boundary lines of the rectangle, each of said corners provided with flats such that the flats of one section engage the flats of an adjacent section in planes parallel to said boundary lines in the assembled position of the sections, each pair of engaging flats being formed, respectively, with a projecting pin and a cylindrical recess forming a claw member engaging said pin, the improvement consisting in the end portions of said walls adjacent to said corners flaring outwardly, starting at predetermined points from the ends thereof, such as to cause the surfaces of one wall to gradually merge into the surfaces of the adjacent walls of both the same and adjacent sections in the assembled position and to cause the shanks of said claw members to have a substantially lesser thickness in the center than at the ends thereof, the medial lines of the walls of adjacent sections having a common intersection point being displaced from the center of said pin and recess in a direction at a right angle to the boundary line between the sections and away from the section formed with the claw member.

References Cited in the file of this patent

UNITED STATES PATENTS

| | | |
|---|---|---|
| 2,756,325 | Zwick | July 24, 1956 |

FOREIGN PATENTS

| | | |
|---|---|---|
| 1,052,547 | France | Sept. 23, 1953 |